(12) United States Patent
Amano et al.

(10) Patent No.: US 12,326,606 B2
(45) Date of Patent: Jun. 10, 2025

(54) OPTICAL-FIBER RIBBON, DIE, AND METHOD OF MANUFACTURING OPTICAL-FIBER RIBBON

(71) Applicant: SUMITOMO ELECTRIC INDUSTRIES, LTD., Osaka (JP)

(72) Inventors: Reo Amano, Osaka (JP); Deva Omalka Vayanthi Suduwa, Osaka (JP); Kentaro Takeda, Osaka (JP); Makoto Itoh, Osaka (JP); Ken Manabe, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 223 days.

(21) Appl. No.: 18/247,279

(22) PCT Filed: Oct. 6, 2021

(86) PCT No.: PCT/JP2021/036995
§ 371 (c)(1),
(2) Date: Mar. 30, 2023

(87) PCT Pub. No.: WO2022/075364
PCT Pub. Date: Apr. 14, 2022

(65) Prior Publication Data
US 2023/0408786 A1   Dec. 21, 2023

(30) Foreign Application Priority Data

Oct. 7, 2020   (JP) ................. 2020-169681

(51) Int. Cl.
*G02B 6/44* (2006.01)
(52) U.S. Cl.
CPC .............. *G02B 6/448* (2013.01); *G02B 6/443* (2013.01)

(58) Field of Classification Search
CPC .................. G02B 6/448; G02B 6/443
(Continued)

(56) References Cited

U.S. PATENT DOCUMENTS

| 2010/0296781 | A1 | 11/2010 | Sato et al. |
| 2017/0299829 | A1 | 10/2017 | Hoshino et al. |
| 2021/0055492 | A1 | 2/2021 | Suduwa et al. |

FOREIGN PATENT DOCUMENTS

| FR | 2752063 A1 | 2/1998 |
| JP | H01-138516 A | 5/1989 |

(Continued)

OTHER PUBLICATIONS

International Search Report issued in Patent Application No. PCT/JP2021/036995 dated Dec. 2021.

*Primary Examiner* — Jerry M Blevins
(74) *Attorney, Agent, or Firm* — MCDONALD HOPKINS LLC (57) ABSTRACT

An optical-fiber ribbon includes a plurality of optical-fibers, and a common covering layer. There are formed a plurality of intermittent connection portions in which a first connection portion that is formed from the common covering layer and a non-connection portion are alternately formed between the optical-fibers. There are formed a plurality of continuous connection portions in which a second connection portion that is formed from the common covering layer is continuously formed between optical-fibers. The intermittent connection portions include a central intermittent connection portion at a central portion of the optical-fiber ribbon in a width direction. The continuous connection portions include adjacent continuous connection portions. A thickness of adjacent continuous connection portion is larger than a thickness of the central intermittent connection portion and is larger than a thickness of the continuous connection (Continued)

portion other than the adjacent continuous connection portions.

3 Claims, 4 Drawing Sheets

(58) Field of Classification Search
USPC .......................................................... 385/114
See application file for complete search history.

(56) References Cited

FOREIGN PATENT DOCUMENTS

| | | | |
|---|---|---|---|
| JP | H01-150106 A | 6/1989 | |
| JP | 2009-163045 A | 7/2009 | |
| JP | 2011-150183 A | 8/2011 | |
| JP | 2016-061869 A | 4/2016 | |
| JP | 2019074644 A * | 5/2019 | ............. G02B 6/448 |
| WO | 2020/208816 A1 | 10/2020 | |

* cited by examiner

FIG.2

FIG.3

OPTICAL-FIBER RIBBON, DIE, AND METHOD OF MANUFACTURING OPTICAL-FIBER RIBBON

TECHNICAL FIELD

The present disclosure relates to an optical-fiber ribbon, a die for manufacturing the optical-fiber ribbon, and a method of manufacturing the optical-fiber ribbon using the die. This application claims priority based on Japanese Patent Application No. 2020-169681 filed on Oct. 7, 2020, and the entire contents of the Japanese patent application are incorporated herein by reference.

BACKGROUND ART

PTL 1 discloses a method of manufacturing an intermittent optical fiber ribbon (also referred to as an intermittent ribbon) which can be separated into two optical-fibers. In the intermittent ribbon, a connection portion and a non-connection portion are alternately formed in a longitudinal direction, adjacent optical-fibers are intermittently connected to each other, and periodic cuts penetrating in a thickness direction are formed by a cutting roller.

PRIOR ART DOCUMENT

Patent Literature

PTL 1: Japanese Unexamined Patent Application Publication No. 2019-74644

SUMMARY OF INVENTION

An optical-fiber ribbon according to one aspect of the present disclosure includes a plurality of optical-fibers, and a common covering layer configured to cover and integrate the plurality of optical-fibers. There are formed a plurality of intermittent connection portions in which, in a longitudinal direction of the plurality of optical-fibers, a first connection portion that is formed from the common covering layer and a non-connection portion that is formed by forming a cut in the common covering layer are alternately formed between every two or more of predetermined ones of the optical-fibers. There are formed a plurality of continuous connection portions in which, in the longitudinal direction, a second connection portion that is formed from the common covering layer is continuously formed between optical-fibers other than between the optical-fibers where the plurality of intermittent connection portions are formed. The plurality of optical-fibers are even in number. The plurality of intermittent connection portions include a central intermittent connection portion at a central portion of the optical-fiber ribbon in a width direction. The plurality of continuous connection portions include, at two pairs of the optical-fibers between which the central portion is interposed in the width direction, adjacent continuous connection portions, each being formed between a corresponding pair of the two pairs of the optical-fibers. A thickness of each adjacent continuous connection portion is larger than a thickness of the central intermittent connection portion and is larger than a thickness of the continuous connection portion or the continuous connection portions other than the adjacent continuous connection portions.

A die according to one aspect of the present disclosure is a die for manufacturing an optical-fiber ribbon having a plurality of holes through which each of a plurality of optical-fibers arranged in parallel passes. The number of the plurality of holes is even. Adjacent ones of the plurality of holes communicate with each other. A plurality of interhole portions, between which surfaces disposed in parallel of the plurality of optical-fibers are interposed, are formed at a communication portion of the adjacent ones of the plurality of holes. The plurality of interhole portions include a first opposing portion that is formed at a central portion of the optical-fiber ribbon in a width direction, and second opposing portions that are formed on two sides of the central portion of the optical-fiber ribbon in the width direction. A ratio between an opposing distance of the first opposing portions and an opposing distance of the second opposing portions is 1:1.1 or greater.

A manufacturing method according to an embodiment of the present disclosure is a method of manufacturing an optical-fiber ribbon using the die.

DESCRIPTION OF EMBODIMENTS

Problems to be Solved by Present Disclosure

In the manufacture of an optical-fiber ribbon, when a tape resin serving as a common covering layer is applied, in the width direction of the optical-fiber ribbon, the shear stress of the central portion is larger than the shear stress of the edge, and the resin pressure of the central portion is higher than the resin pressure of the edge. The resin is likely to flow into the central portion, the gap between the optical fibers in the central portion is widened, and by more resin flowing into the central portion, the thickness of the common covering layer in the central portion tends to be thicker than the thickness of the common covering layer in the edge in the width direction. Therefore, when an intermittent ribbon is manufactured by forming a cut at a predetermined position between optical fibers of an optical-fiber ribbon as in PTL 1, it has been difficult to stably form the cut between the optical fibers in the width direction central portion. The difference between the resin pressure of the edge in the width direction of the optical-fiber ribbon and the resin pressure of the central portion increases as the manufacturing speed of the optical-fiber ribbon increases. In order to increase the manufacturing speed of the optical-fiber ribbon, it has been desired to take measures to prevent the thickness between the optical-fibers to be cut from increasing.

It is an object of the present disclosure to provide an optical-fiber ribbon suitable for manufacturing an intermittent ribbon, a die, and a method of manufacturing the optical-fiber ribbon.

DESCRIPTION OF EMBODIMENTS OF PRESENT DISCLOSURE

First, the contents of embodiments of the present disclosure will be listed and explained.

(1) An optical-fiber ribbon according to the present disclosure includes a plurality of optical-fibers, and a common covering layer configured to cover and integrate the plurality of optical-fibers. There are formed a plurality of intermittent connection portions in which, in a longitudinal direction of the plurality of optical-fibers, a first connection portion that is formed from the common covering layer and a non-connection portion that is formed by forming a cut in the common covering layer are alternately formed between every two or more of predetermined ones of the optical-fibers. There are formed a plurality of continuous connection portions in which, in the longitudinal direction, a second connection portion that is formed from the common covering layer is continuously formed between optical-fibers other than between the optical-fibers where the plurality of intermittent connection portions are formed. The plurality of optical-fibers are even in number. The plurality of intermittent connection portions include a central intermittent connection portion at a central portion of the optical-fiber ribbon in a width direction. The plurality of continuous connection portions include, at two pairs of the optical-fibers between which the central portion is interposed in the width direction, adjacent continuous connection portions, each being formed between a corresponding pair of the two pairs of the optical-fibers. A thickness of each adjacent continuous connection portion is larger than a thickness of the central intermittent connection portion and is larger than a thickness of the continuous connection portion or the continuous connection portions other than the adjacent continuous connection portions. With such a structure, it is possible to prevent the thickness of the central portion where the cut is made from becoming thick, and it becomes easy to make the cut.

(2) A die according to the present disclosure is a die for manufacturing an optical-fiber ribbon having a plurality of holes through which each of a plurality of optical-fibers arranged in parallel passes. The number of the plurality of holes is even. Adjacent ones of the plurality of holes communicate with each other. A plurality of interhole portions, between which surfaces disposed in parallel of the plurality of optical-fibers are interposed, are formed at a communication portion of the adjacent ones of the plurality of holes. The plurality of interhole portions include a first opposing portion that is formed at a central portion of the optical-fiber ribbon in a width direction, and second opposing portions that are formed on two sides of the central portion of the optical-fiber ribbon in the width direction. A ratio between an opposing distance of the first opposing portions and an opposing distance of the second opposing portions is 1:1.1 or greater. The die has the first opposing portions that form a cut and the second opposing portions that do not form a cut with respect to the optical-fiber ribbon coated with the common covering layer, and the ratio between the opposing distance of the first opposing portions and the opposing distance of the second opposing portions is 1:1.1 or greater. Therefore, the resin is more likely to stay at the second opposing portions than at the first opposing portions opposing with a narrow gap. Therefore, it is possible to prevent the thickness of the common covering layer between the optical-fibers at the first opposing portion from increasing, and it becomes easy to cut the central portion when manufacturing the intermittent ribbon.

(3) In one embodiment of the die of the present disclosure, the plurality of interhole portions include third opposing portions being portions excluding the first opposing portions and the second opposing portions and being formed at the communication portion other than every two or more of predetermined ones of communication portions. A ratio between an opposing distance of the third opposing portions and the opposing distance of the second opposing portions is 1:1.03 or greater. Since the die has the third opposing portions that do not form a cut like the second opposing portions, and the ratio between the opposing distance of the third opposing portions and the opposing distance of the second opposing portions is 1:1.03 or greater, the resin is more likely to stay at the location of the second opposing portions than at the location of the third opposing portions opposing with a narrower gap. Accordingly, the resin is more likely to be accumulated in the second opposing portions than in the first opposing portions, and thus the thickness of the common covering layer between the optical-fibers can be more reliably formed to be thin in the first opposing portions.

(4) An embodiment of a method of manufacturing an optical-fiber ribbon disclosed in the present disclosure is a method of manufacturing an optical-fiber ribbon using the die. By using the die, the thickness of the common covering layer between predetermined optical-fibers can be made thin. Therefore, when the intermittent ribbon is manufactured, it is easy to cut the optical-fiber ribbon between the optical fibers.

Advantageous Effects of Present Disclosure

According to the above description, it is possible to provide an optical-fiber ribbon suitable for manufacturing an intermittent ribbon, a die for manufacturing the optical-fiber ribbon, and a method of manufacturing the optical-fiber ribbon using the die.

DETAILS OF EMBODIMENTS OF PRESENT DISCLOSURE

Specific examples of an optical-fiber ribbon, a die, and a method of manufacturing an optical-fiber ribbon according to embodiments of the present disclosure will be described below with reference to the drawings. The present disclosure is not limited to the following examples, but is defined by the scope of the claims, and is intended to include all modifications within the meaning and scope equivalent to the scope of the claims. Also, to the extent that combinations of embodiments are possible, the present disclosure includes any combination of embodiments. In the following description, components denoted by the same reference numerals in different drawings are similar to each other, and description thereof may be omitted.

Figure 1:
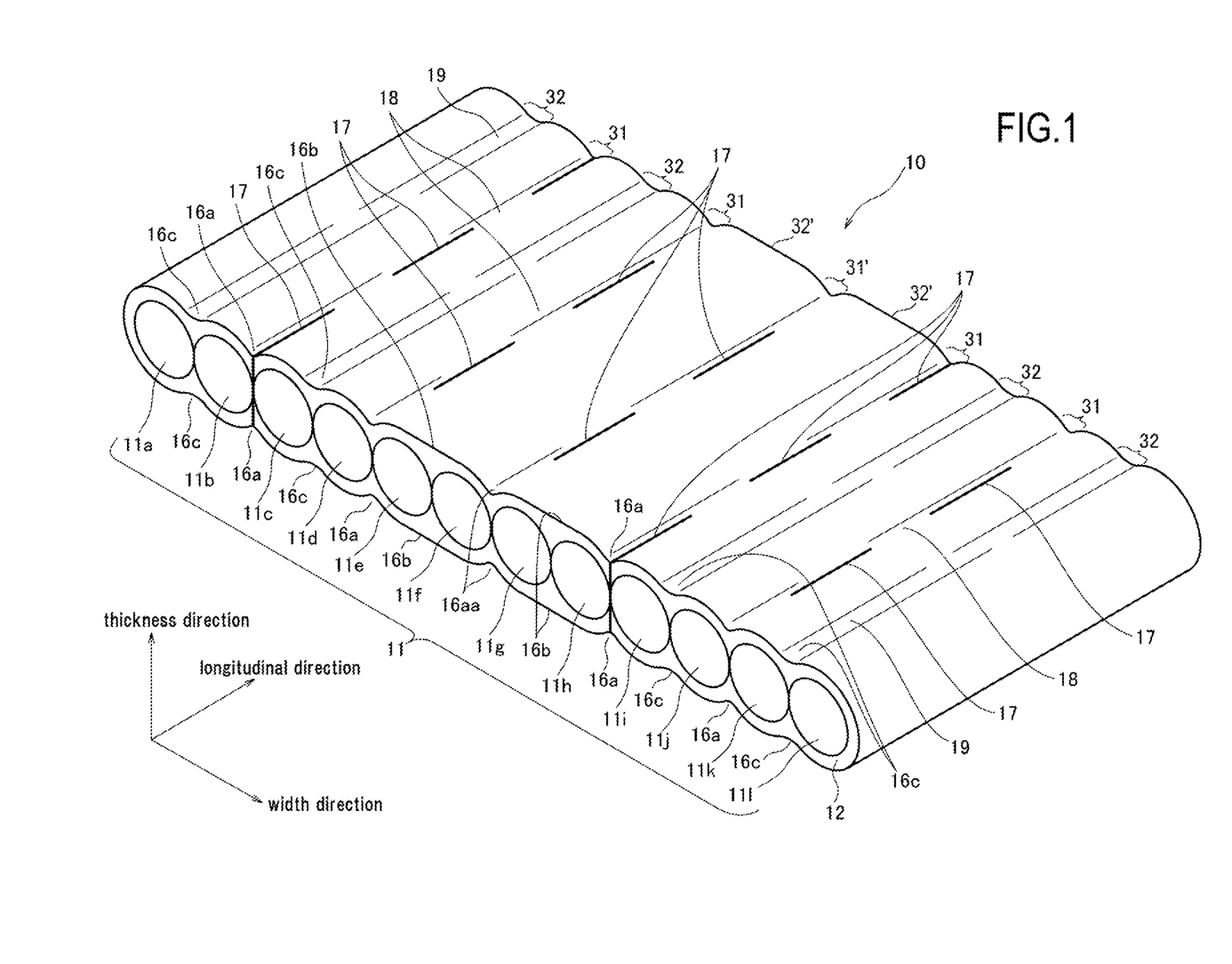
FIG. 1 is a perspective view of an optical-fiber ribbon according to one embodiment of the present disclosure.
Figure 2:
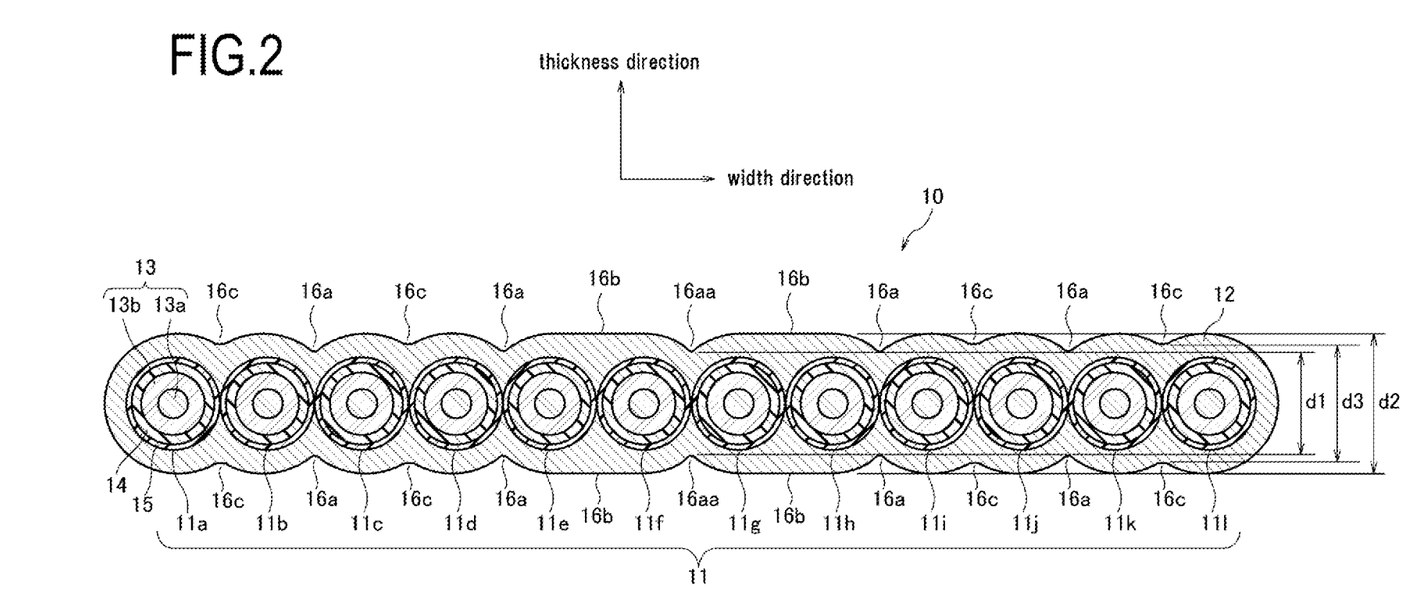
FIG. 2 is a cross-sectional view of an optical-fiber ribbon according to one embodiment of the present disclosure.

FIG. 1 is a perspective view of an optical-fiber ribbon according to one embodiment of the present disclosure. FIG. 2 is a cross-sectional view of an optical-fiber ribbon according to one embodiment of the present disclosure. An optical-fiber ribbon 10 is formed by arranging (juxtaposing) a plurality of, for example, an even number of, for example, twelve, optical-fibers 11 (11a to 11l) in parallel in a state of being in contact with each other, and integrating outer surfaces including upper and lower surfaces disposed in parallel with each other by a common covering layer 12 over the entire length to form a tape shape. Although FIG. 1 and FIG. 2 show the optical-fiber ribbon in a state where optical-fibers 11 are in contact with each other, optical-fibers 11 may be separated from each other without being in contact with each other.

Optical-fiber 11 is a single-core optical fiber. Optical-fiber 11 includes a glass fiber 13, a protective covering 14, and a coloring layer 15. Glass fiber 13 includes a core 13a and a cladding 13b, and has an outer diameter of 125 µm. Protective covering 14 covers the outer periphery of glass fiber 13 and is, for example, an acrylate resin. Coloring layer 15 covers the outer periphery of protective covering 14 and has an outer diameter of about 255 µm. Note that the outer diameter of glass fiber 13 and the outer diameter of optical-fiber 11 are not limited to 125 µm and 255 µm, respectively, and may be smaller, for example, about 100 µm and 200 µm, respectively. Common covering layer 12 of the embodiment of the present disclosure is an ultraviolet curable resin or the like, but may also be a thermal plasticity resin, a thermosetting resin, or the like. Furthermore, protective covering 14 may be composed of two layers.

Optical-fiber ribbon 10 according to the embodiment of the present disclosure is an intermittent ribbon that periodically has a cut 17 penetrating in a thickness direction in common covering layer 12 between every two or more predetermined number of optical-fibers 11. That is, a portion between optical-fiber wires 11 provided with cut 17 is an intermittent connection portion 31 in which a first connection portion 18 that is formed from common covering layer 12 and a non-connection portion that is formed by cut 17 penetrating in the thickness direction and has no common covering layer 12 are alternately formed in the longitudinal direction of optical-fiber ribbon 10. In addition, a portion between optical-fiber wires 11 having no cut 17 is a continuous connection portion 32 in which a second connection portion 19 that is formed from common covering layer 12 is continuously formed in the longitudinal direction of optical-fiber ribbon 10. Since optical-fiber ribbon 10 is constituted by an even number of wires, a central portion in a width direction of optical-fiber ribbon 10 is positioned between the core wires of optical-fiber 11.

In the example shown in FIGS. 1 and 2, cuts 17 are provided between every two optical-fibers 11. More specifically, cuts 17 are provided in common covering layer 12 between optical-fibers 11b and 11c, between optical-fibers 11d and 11e, between optical-fibers 11f and 11g, between optical-fibers 11h and 11i, and between optical-fibers 11j and 11k. Accordingly, a plurality of intermittent connection portions 31 are formed between optical-fibers 11b and 11c, between optical-fibers 11d and 11e, between optical-fibers 11f and 11g, between optical-fibers 11h and 11i, and between optical-fibers 11j and 11k. A plurality of continuous connection portions 32 are formed between optical-fibers 11a and 11b, between optical-fibers 11c and 11d, between optical-fibers 11e and 11f, between optical-fibers 11g and 11h, between optical-fibers 11i and 11j, and between optical-fibers 11k and 11l.

Recessed portions 16a, 16aa, and 16c in which common covering layer 12 is recessed and flat portions 16b in which common covering layer 12 is flat in the width direction are formed in common covering layer 12 between adjacent optical-fibers 11. Flat portions 16b are formed, at two pairs of the optical-fiber wires (a pair of optical-fibers 11e and 11f and a pair of optical-fibers 11g and 11h) between which the central portion is interposed in the width direction, on adjacent continuous connection portions 32' between each pair of optical-fibers (between optical-fibers 11e and 11f and between optical-fibers 11g and 11h). Recessed portion 16aa is formed on a central intermittent connection portion 31' at the central portion in the width direction of the optical-fiber ribbon (between optical-fibers 11f and 11g). Recessed portion 16a is formed on intermittent connection portions 31 (between optical-fibers 11b and 11c, between optical-fibers 11d and 11e, between optical-fibers 11h and 11i, and between optical-fibers 11j and 11k) other than the central portion in the width direction of the optical-fiber ribbon (between optical-fibers 11f and 11g). Recessed portion 16c is formed on continuous connection portions 32 (between optical-fibers 11a and 11b, between optical-fibers 11c and 11d, between optical-fibers 11i and 11j, and between optical-fibers 11k and 11l) other than two sides of the central portion in the width direction.

In the embodiment of the present disclosure, flat portion 16b is thicker than recessed portion 16aa and thicker than recessed portion 16c. Recessed portion 16a is thicker than recessed portion 16aa. Recessed portion 16a may be thicker or thinner than recessed portion 16c. It should be noted that a thickness of intermittent connection portion 31 (recessed portion 16aa) represents a thickness of the connection portion where the common covering layer is present in the intermittent connection portion.

In the case of optical-fiber ribbon 10 in which the outer diameter of optical-fiber 11 is 200 µm, a thickness d1 of intermittent connection portion 31 at the central portion in the width direction of optical-fiber ribbon 10 is preferably 160 to 180 µm. In the case of optical-fiber ribbon 10 in which the outer diameter of optical-fiber 11 is 250 µm, thickness d1 of intermittent connection portion 31 at the central portion in the width direction of optical-fiber ribbon 10 is preferably 200 to 220 µm.

In the embodiment of the present disclosure, a thickness d2 of continuous connection portion 32 (thickness of flat portion 16b) on two sides of the central portion in the width direction of optical-fiber ribbon 10 is thicker than thickness d1 of intermittent connection portion 31 (the thickness of recessed portion 16aa) at the central portion in the width direction optical-fiber ribbon 10, and in addition, thicker than a thickness d3 of continuous connection portion 32 (thickness of recessed portion 16c) at a portion other than two sides of the central portion in the width direction of optical-fiber ribbon 10.

Generally, when the manufacturing speed of the optical-fiber ribbon is high, the coating between the optical-fibers in the central portion tends to be thicker than the coating between the optical-fibers in the edge in the width direction. However, at the two pairs of the optical-fibers between which the central portion is interposed in the width direction of optical-fiber ribbon 10, each thickness d2 of adjacent continuous connection portion 32' in which no cut 17 is formed between optical-fibers in each pair is thicker than thickness d1 of central intermittent connection portion 31' in which cuts 17 are formed and located at the central portion in the width direction of optical-fiber ribbon 10, and thicker than thickness d3 of continuous connection portions 32 other than two sided of the central portion in the width direction (other than adjacent continuous connection portions 32'). With such a structure, even when the shear stress of the central portion is increased, it is possible to prevent thickness d1 of central intermittent connection portion 31' of the central portion in the width direction of optical-fiber ribbon 10 from being increased. Further, when the intermittent ribbon is manufactured, cuts can be easily formed between optical-fibers 11 at the central portion.

Figure 3:
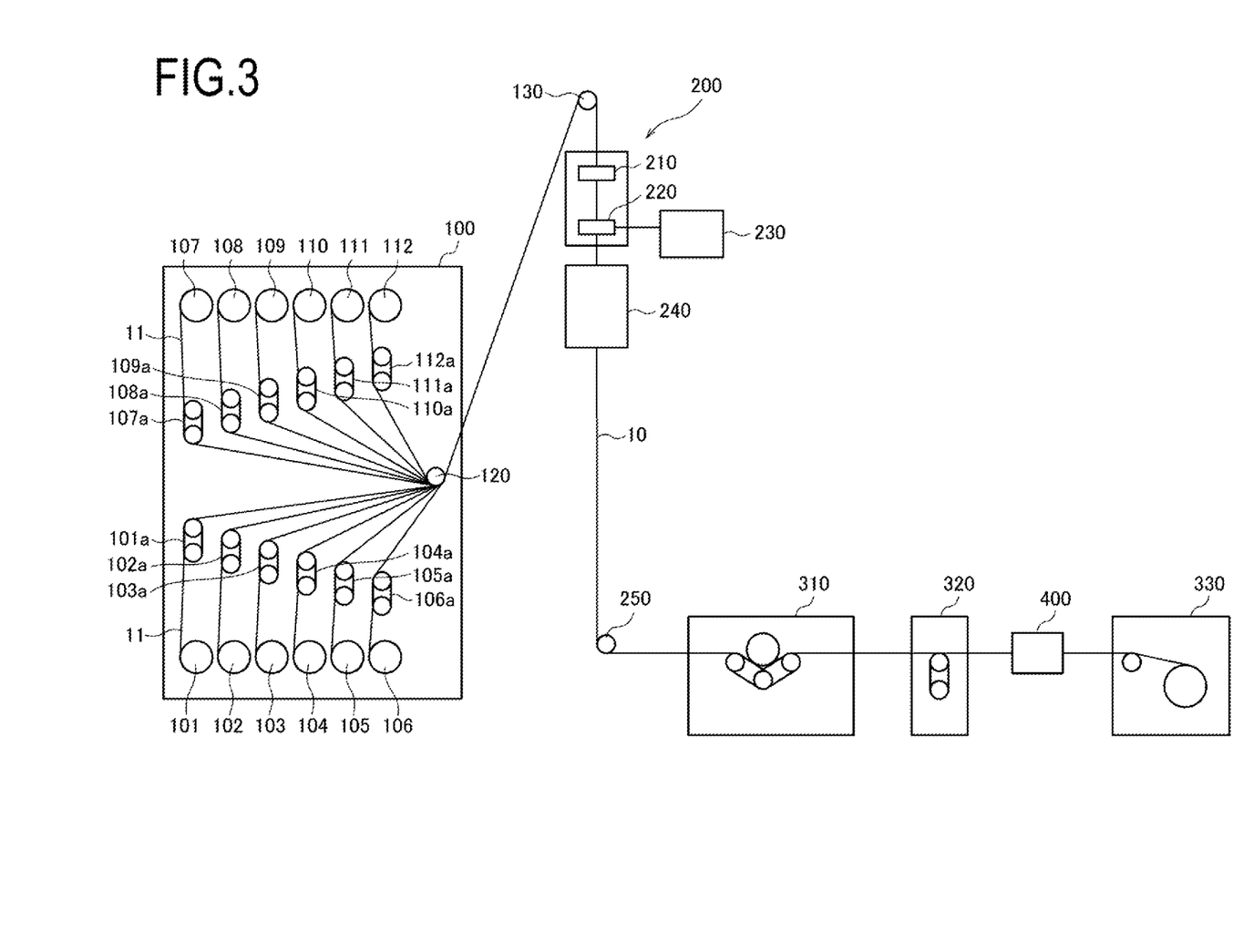
FIG. 3 shows a method of manufacturing an optical-fiber ribbon according to an embodiment of the present disclosure.
Figure 4:
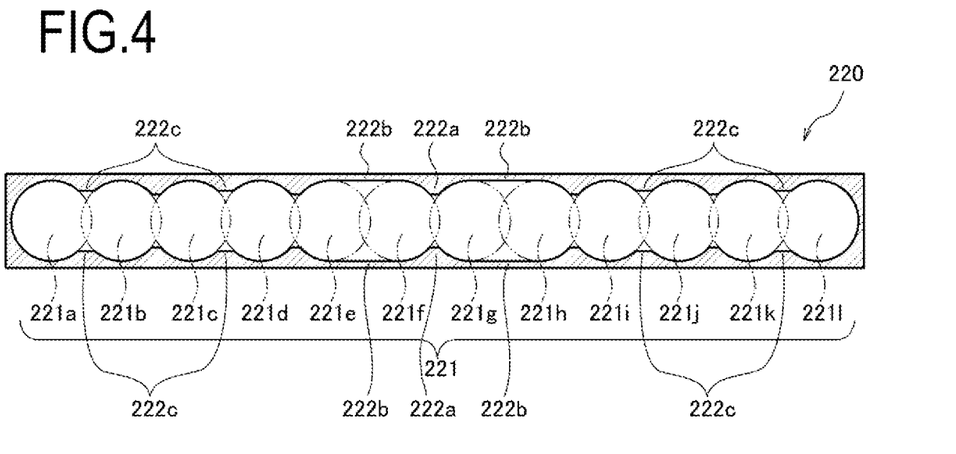
FIG. 4 is a cross-sectional view of a die according to one embodiment of the present disclosure.
Figure 5:
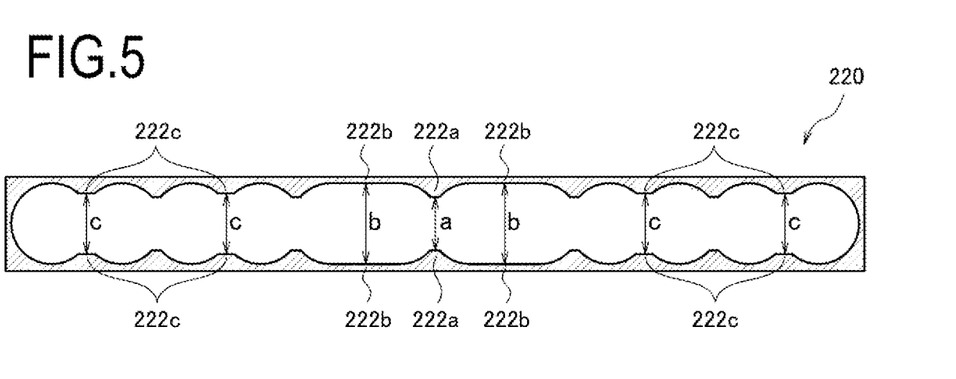
FIG. 5 is a view for explaining dimensions of the die shown in FIG. 4.

Next, a method of manufacturing an optical-fiber ribbon according to an embodiment of the present disclosure will be described. FIG. 3 shows a method of manufacturing the optical-fiber ribbon according to the embodiment of the present disclosure. FIGS. 4 and 5 are cross-sectional views of a die according to an embodiment of the present disclosure. A manufacturing apparatus of the optical-fiber ribbon includes a supply device 100. In supply device 100, N reels 101 to 112 (in this embodiment, N is 12) corresponding to the number of optical fibers in optical-fiber ribbon 10, N dancer rollers 101a to 112a, and a guide roller 120 are provided. Optical-fiber 11 is wound around each of reels 101 to 112. Optical-fibers 11 are reeled out from reels 101 to 112, respectively, are given a tension of several tens gf by dancer rollers 101a to 112a, respectively, and are arranged on one arrangement plane when passing through guide roller 120. Optical-fiber 11 is further concentrated by a guide roller directly above 130 and sent to a coating device 200.

Optical-fiber 11 is inserted into coating device 200 and is pulled with a predetermined tension from the downstream side. As a result, inserted optical-fiber 11 is guided by a nipple 210 to have a desired arrangement, and is sent to a die 220. In die 220, an UV-curable resin as common covering layer 12 shown in FIG. 1 is applied around juxtaposed optical-fibers 11. The UV-curable resin is supplied from a resin tank 230 which is a pressurized type. Twelve optical-fibers 11 coated with the UV-curable resin are irradiated with ultraviolet rays in an ultraviolet irradiation device 240 to be cured. The cured UV-curable resin becomes common covering layer 12 to form 12-core optical-fiber ribbon 10.

Optical-fiber ribbon 10 cured by being irradiated with ultraviolet rays from ultraviolet irradiation device 240 is sent to a take-up device 330 having a reel via a guide roller 250, a delivery capstan 310, a take-up tension control dancer roller 320, and an intermittent processing device 400. Intermittent processing device 400 cuts through common covering layer 12 between predetermined optical-fibers 11 of optical-fiber ribbon in the thickness direction periodically along the longitudinal direction by using, for example, a cutting roller (not shown) so that intermittent connection portion 31 of optical-fiber ribbon 10 is formed. In take-up device 330, optical-fiber ribbon 10 that has become an intermittent ribbon is wound around a reel via a guide. The winding tension of entire optical-fiber ribbon 10 is, for example, several tens gf to several hundreds gf.

In this way, optical-fiber ribbon 10 shown in FIG. 1 is manufactured, but in coating device 200, the thermal plasticity resin may be coated instead of the UV-curable resin as the taping resin forming common covering layer 12. In this case, coating device 200 includes an extruder for extruding the thermal plasticity resin and a cooling device for cooling the extruded resin. In either case, curing the resin as soon as possible after passing through die 220 is effective in maintaining the shape of optical-fiber ribbon 10.

Next, die 220 will be described. As shown in FIG. 4, die 220 of the embodiment has, for example, twelve holes 221 (221a to 221l) through which twelve optical-fibers 11 pass, respectively, and adjacent holes 221 communicate with each other. The number of holes is an even number. A plurality of interhole portions between which surfaces disposed in parallel of the plurality of optical-fibers are interposed, are formed at communication portions of adjacent ones of the plurality of adjacent holes 221. Note that the interhole portion represents a gap in a connection portion of the adjacent one of the plurality of holes 221. The plurality of interhole portions includes a first opposing portion 222a-222a, second opposing portions 222b-222b, and third opposing portions 222c-222c. First opposing portion 222a-222a is formed at the central portion in the width direction optical-fiber ribbon 10. Second opposing portions 222b-222b are formed on two sides of the central portion in the width direction of optical-fiber ribbon 10, facing each other with a wider gap than first opposing portion 222a-222a in the thickness direction. Third opposing portions 222c-222c are formed at connection portions every two or more of predetermined ones of communication portions other than the central portion in the width direction of optical-fiber ribbon 10 and other than both sides thereof (portions excluding first opposing portion 222a-222a and second opposing portions 222b-222b). In the optical-fiber ribbon covered with common covering layer 12 by die 220, a portion passing through first opposing portion 222a-222a becomes central intermittent connection portion 31', a portion passing through second opposing portion 222b-222b becomes adjacent continuous connection portion 32', and a portion passing through third opposing portion 222c-222c becomes continuous connection portion 32.

In the embodiment of the present disclosure, as shown in FIG. 5, first opposing portion 222a-222a having the shortest opposing distance a is formed between hole 221f and hole 221g, and second opposing portions 222b-222b having the longest opposing distance b are formed between hole 221e and hole 221f and between hole 221g and hole 221h. Other than that, for example, between hole 221a and hole 221b, between hole 221c and hole 221d, between hole 221i and hole 221j, and between hole 221k and hole 221l, third opposing portions 222c-222c are formed in which each opposing distance c is longer than opposing distance a of first opposing portion 222a-222a and shorter than opposing distance b of second opposing portion 222b-222b.

More specifically, when the outer diameter of optical-fiber 11 is 200 μm, the ratio between opposing distance a of first opposing portion 222a-222a and opposing distance b of second opposing portion 222b-222b is set to 1:1.6, for example, and the ratio between opposing distance a of first opposing portion 222a-222a and opposing distance c of third opposing portion 222c-222c is set to 1:1.2, for example. In this case, the ratio between opposing distance c of third opposing portion 222c-222c and opposing distance b of second opposing portion 222b-222b is 1:1.33.

When the outer diameter of optical-fiber 11 is 250 μm, the ratio between opposing distance a of first opposing portion 222a-222a and opposing distance b of second opposing portion 222b-222b is set to, for example, 1:1.8, and the ratio between opposing distance a of first opposing portion 222a-222a and opposing distance c of third opposing portion 222c-222c is set to, for example, 1:1.7. In this case, the ratio between opposing distance c of third opposing portion 222c-222c and opposing distance b of second opposing portion 222b-222b is 1:1.06. Even when the outer diameter of optical-fiber 11 is 200 μm or 250 μm, the ratio between opposing distance a of first opposing portion 222a-222a and opposing distance b of second opposing portion 222b-222b is 1:1.1 or greater. Similarly, even when the outer diameter of optical-fiber 11 is 200 μm or 250 μm, the ratio between opposing distance c of third opposing portion 222c-222c and opposing distance b of second opposing portion 222b-222b is 1:1.03 or greater.

Die 220 has the first opposing portion which is the interhole portion at the central portion forming a cut with respect to an optical-fiber ribbon coated with a common covering layer, and the second opposing portions which are the interhole portions on both sides of the central portion not forming a cut. The second opposing portion has a wider gap than the first opposing portion. Therefore, the resin pressure at the first opposing portion opposing at the narrowest gap (opposing distance a) is lower than the resin pressure at the second opposing portion opposing at the wide gap (opposing distance b), and the resin tends to stay at the second opposing portion opposing at the wider gap (opposing distance b) than at the first opposing portion opposing at the narrowest gap (opposing distance a). Therefore, it is possible to prevent the thickness of common covering layer 12 between optical-fibers 11 from increasing at the first opposing portion. Since the swelling of the resin in the first opposing portion can be suppressed, when the intermittent ribbon is manufactured, it becomes easy to make a cut between optical-fibers 11 of optical-fiber ribbon 10 at a thin portion (a portion corresponding to opposing distance a) of common covering layer 12.

Die 220 has third opposing portions that do not form a cut. The opposing distance of the third opposing portion has a narrower gap than the opposing distance of the second opposing portion. Therefore, the resin is more likely to stay at the location of the second opposing portion facing with a wider gap (opposing distance b) than at the location of the third opposing portion facing with a narrower gap (opposing distance c). Thus, the resin is more likely to be accumulated at the second opposing portion. Accordingly, the thickness of the common covering layer between the optical-fibers may be more reliably formed to be thin at the location of the first opposing portion facing each other with the narrowest gap (opposing distance a).

As described above, as the optical-fiber ribbon according to the embodiment of the present disclosure, the case where the predetermined number of two or more is two has been described, but the predetermined number may be any number as long as it is an integer of two or more. Similarly, with respect to the die, although the case where the predetermined number of two or more is two has been described, the predetermined number may be a number other than two as long as it is an integer two or more.

REFERENCE SIGNS LIST 10 optical-fiber ribbon, 11, 11a to 11l optical-fiber, 12 common covering layer, 13 glass fiber, 13a core, 13b cladding, 14 protective covering, 15 coloring layer, 16a 16aa 16c recessed portion, 16b flat portion, 17 cut (non-connection portion), 18 first connection portion, 19 second connection portion, 31 intermittent connection portion, 31' central intermittent connection portion, 32 continuous connection portion, 32' adjacent continuous connection portion, 100 supply device, 101 to 112 reel, 101a to 112a dancer roller, 120 guide roller, 130 guide roller directly above, 200 coating device, 210 nipple, 220 die, 221, 221a to 221l hole, 222a, 222b, 222c opposing portion, 230 resin tank, 240 ultraviolet irradiation device, 250 guide roller, 310 delivery capstan, 320 take-up tension control dancer roller, 330 take-up device, 400 intermittent processing device

What is claimed is:

1. An optical-fiber ribbon comprising:
    a plurality of optical-fibers; and
    a common covering layer configured to cover and integrate the plurality of optical-fibers,
    wherein there are formed a plurality of intermittent connection portions in which, in a longitudinal direction of the plurality of optical-fibers, a first connection portion that is formed from the common covering layer and a non-connection portion that is formed by forming a cut in the common covering layer are alternately formed between every two or more of predetermined ones of the optical-fibers,
    wherein there are formed a plurality of continuous connection portions in which, in the longitudinal direction, a second connection portion that is formed from the common covering layer is continuously formed between optical-fibers other than between the optical-fibers where the plurality of intermittent connection portions are formed,
    wherein the plurality of optical-fibers are even in number,
    wherein the plurality of intermittent connection portions include a central intermittent connection portion at a central portion of the optical-fiber ribbon in a width direction,
    wherein the plurality of continuous connection portions include, at two pairs of the optical-fibers between which the central portion is interposed in the width direction, adjacent continuous connection portions, each being formed between a corresponding pair of the two pairs of the optical-fibers, and remaining continuous connection portions other than the adjacent continuous connection portions,
    wherein a thickness of each adjacent continuous connection portion is larger than a thickness of the central intermittent connection portion and is also larger than a thickness of the remaining continuous connection portions, and
    wherein the adjacent continuous connection portions of the central portion have flat portions in the width direction.

2. A die for manufacturing an optical-fiber ribbon having a plurality of holes through which each of a plurality of optical-fibers arranged in parallel passes,
    wherein the number of the plurality of holes is even,
    wherein adjacent ones of the plurality of holes communicate with each other,
    wherein a plurality of interhole portions, between which surfaces disposed in parallel of the plurality of optical-fibers are interposed, are formed at a communication portion of the adjacent ones of the plurality of holes,
    wherein the plurality of interhole portions include a first opposing portion that is formed at a central portion of the optical-fiber ribbon in a width direction, and second opposing portions that are formed on two sides of the central portion of the optical-fiber ribbon in the width direction,
    wherein the plurality of interhole portions include third opposing portions being portions excluding the first opposing portions and the second opposing portions and being formed at the communication portion other than every two or more of predetermined ones of communication portions,
    wherein a ratio between an opposing distance of the first opposing portions and an opposing distance of the second opposing portions is 1:1.1 or greater, and
    wherein a ratio between an opposing distance of the third opposing portions and the opposing distance of the second opposing portions is 1:1.03 or greater.

3. A method of manufacturing an optical-fiber ribbon using the die according to claim 2.

* * * * *